(No Model.)　　　　　　　　　　　　　　　5 Sheets—Sheet 1.
L. N. SHOEMAKER.
GAME APPARATUS.

No. 601,287.　　　　　　　　Patented Mar. 29, 1898.

WITNESSES:　　　　　　　　　　　　　　INVENTOR:
N. P. Clyburn　　　　　　　　　　　　Lockert N. Shoemaker,
A. B. Newman　　　　　　　　　　　　　　BY
　　　　　　　　　　　　　　　　　Eugene L. Arnott,
　　　　　　　　　　　　　　　　　　　　ATTORNEY.

(No Model.)  5 Sheets—Sheet 2.

L. N. SHOEMAKER.
GAME APPARATUS.

No. 601,287. Patented Mar. 29, 1898.

WITNESSES:
N. P. Clyburn
U. B. Newman

INVENTOR:
Lockert N. Shoemaker,
BY
Eugene L. Arnott,
ATTORNEY.

(No Model.)  5 Sheets—Sheet 3.

L. N. SHOEMAKER.
GAME APPARATUS.

No. 601,287. Patented Mar. 29, 1898.

WITNESSES:
N. P. Clyburn
U. B. Newman

INVENTOR:
Lockert N. Shoemaker,
BY
Eugene L. Arnott,
ATTORNEY.

(No Model.) 5 Sheets—Sheet 4.
L. N. SHOEMAKER.
GAME APPARATUS.

No. 601,287. Patented Mar. 29, 1898.

WITNESSES:
N. P. Clyburn
U. B. Newman

INVENTOR:
Lockert N. Shoemaker
BY
Eugene L. Arnott,
ATTORNEY.

(No Model.)     5 Sheets—Sheet 5.

L. N. SHOEMAKER.
GAME APPARATUS.

No. 601,287. Patented Mar. 29, 1898.

WITNESSES: N. P. Clyburn, A. B. Newman

INVENTOR: Lockert N. Shoemaker,
BY Eugene L. Arnott, ATTORNEY.

UNITED STATES PATENT OFFICE.

LOCKERT N. SHOEMAKER, OF GREENFIELD, OHIO.

GAME APPARATUS.

SPECIFICATION forming part of Letters Patent No. 601,287, dated March 29, 1898.

Application filed March 15, 1897. Serial No. 627,567. (No model.)

*To all whom it may concern:*

Be it known that I, LOCKERT N. SHOEMAKER, a citizen of the United States, residing at Greenfield, in the county of Highland and State of Ohio, have invented an Improved Game Apparatus, of which the following is a specification, reference being had to the accompanying drawings.

This invention relates to a game apparatus; and the object of the invention is to produce an improved apparatus of the character hereinafter set forth.

Figure 1:
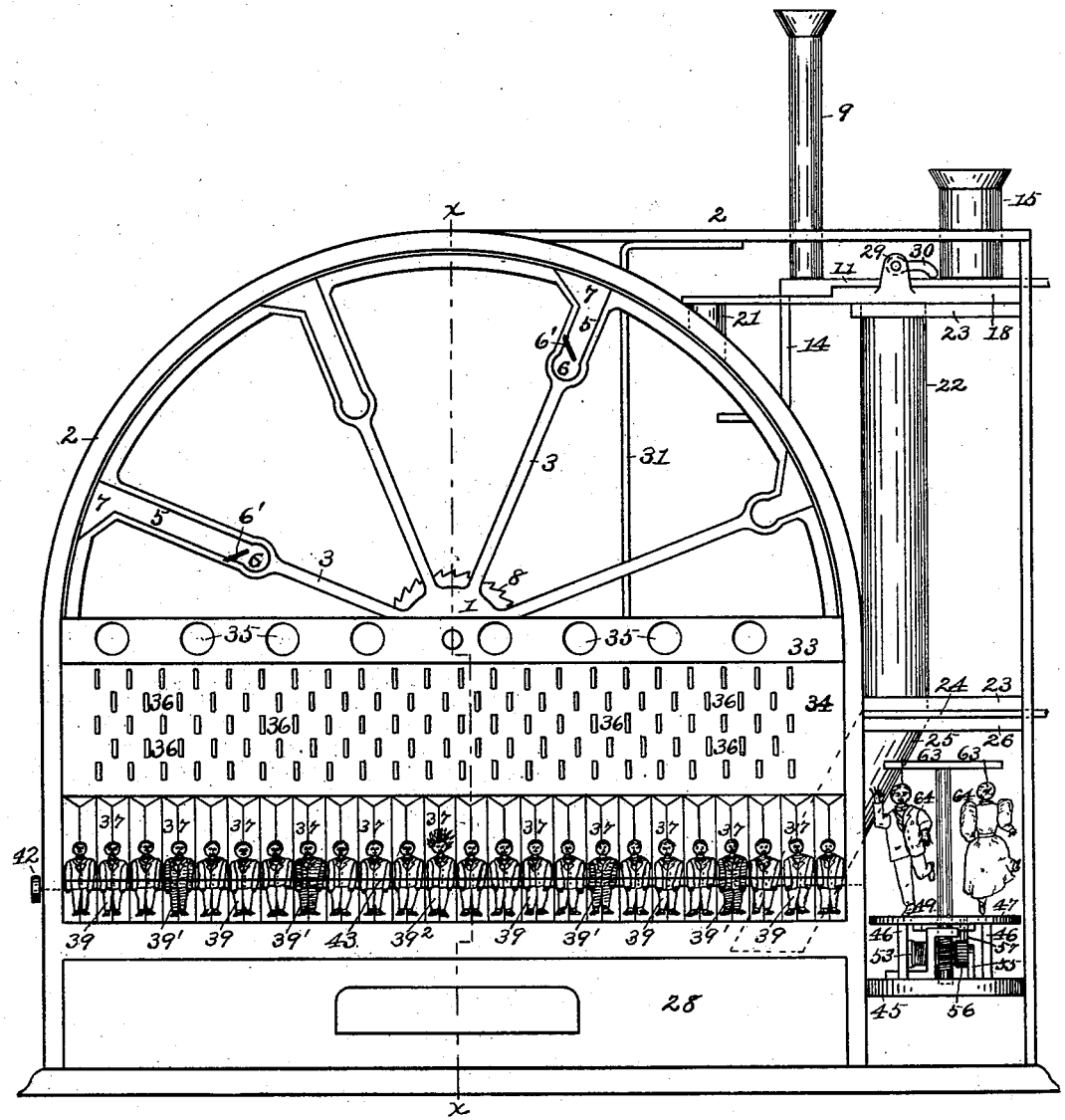
Figure 16:
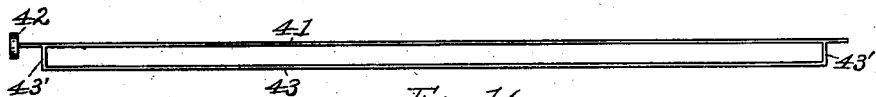
Figure 17:
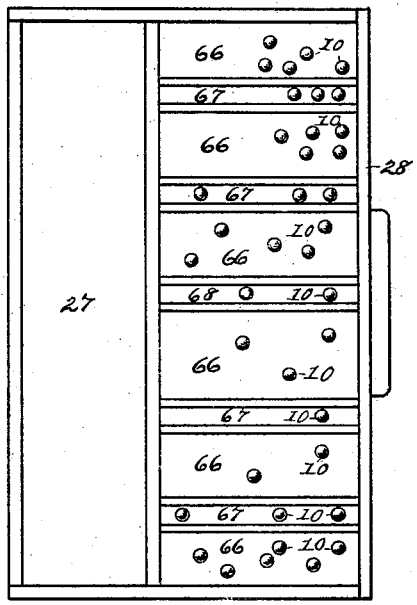
Figure 2:
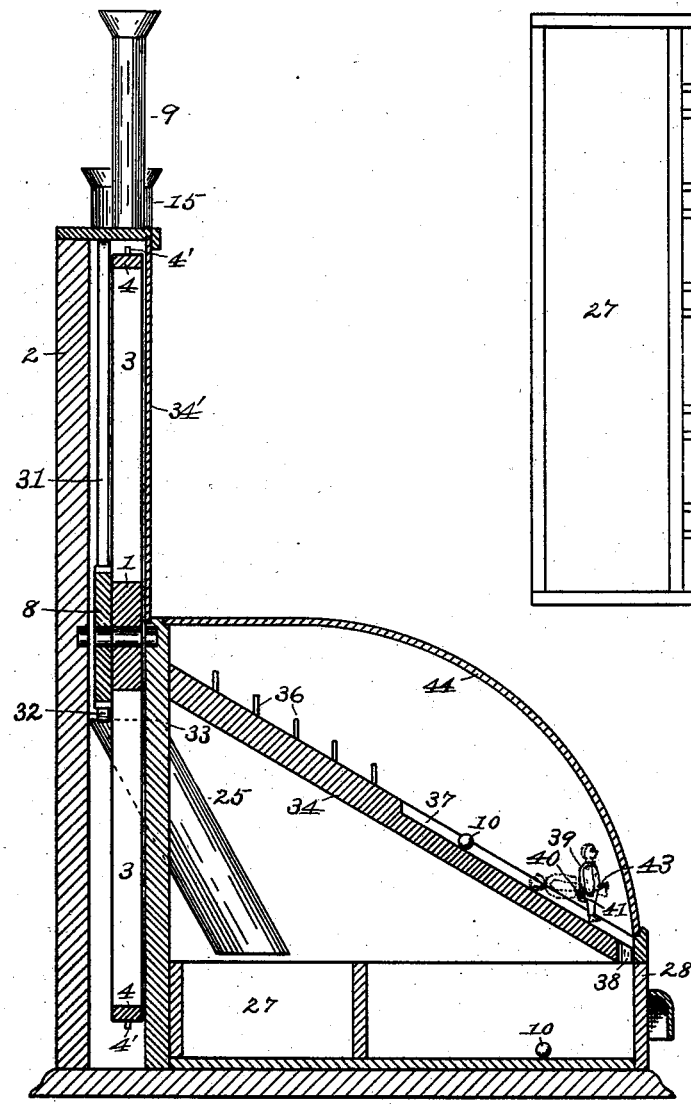
Figure 3:
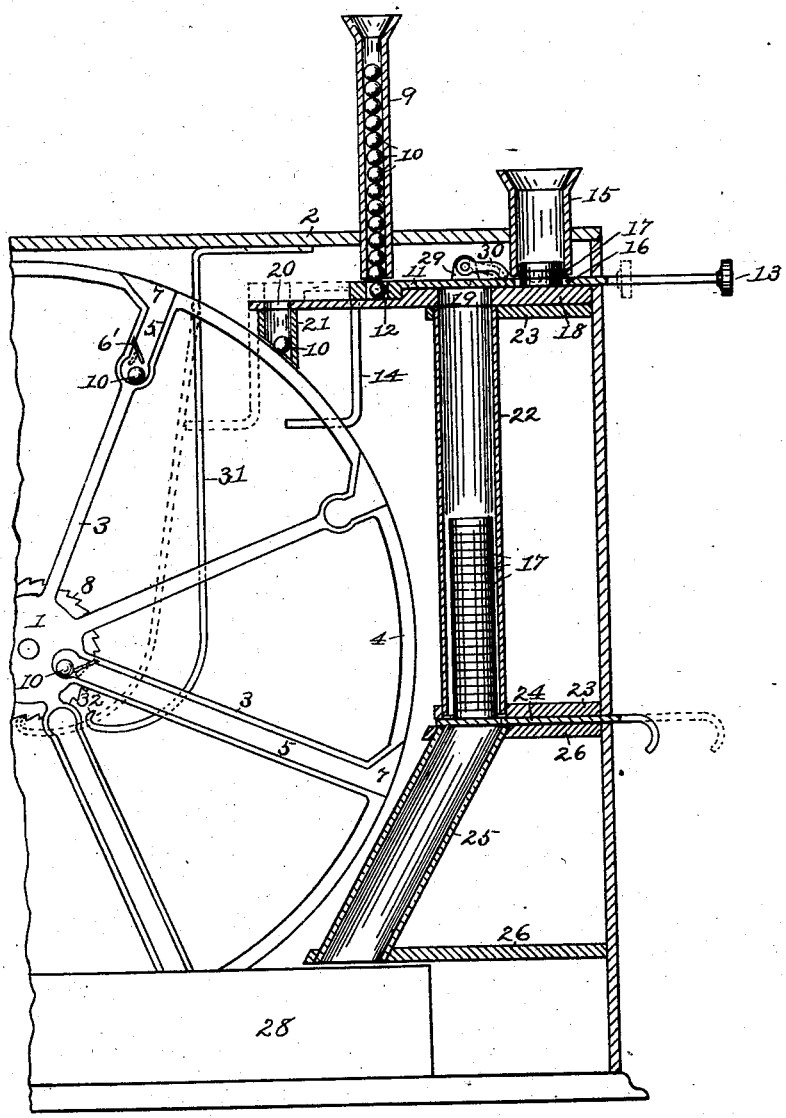
Figure 4:
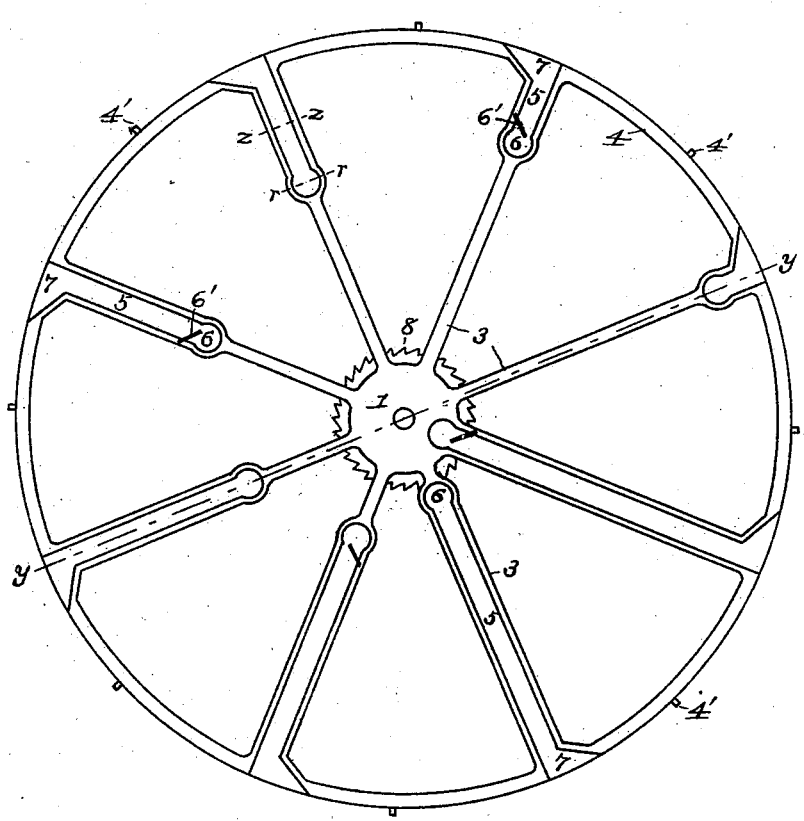
Figure 5:
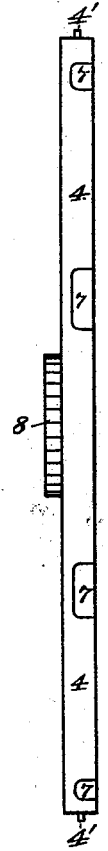
Figure 6:
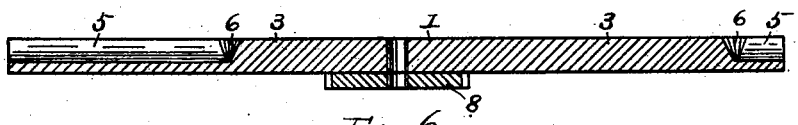
Figure 7:
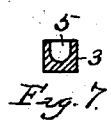
Figure 8:
Figure 9:
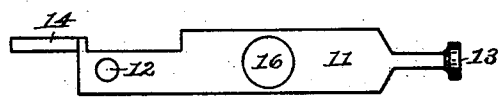
Figure 11:
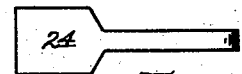
Figure 10:
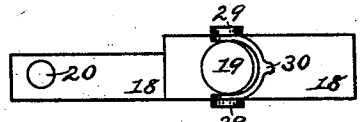
Figure 12:
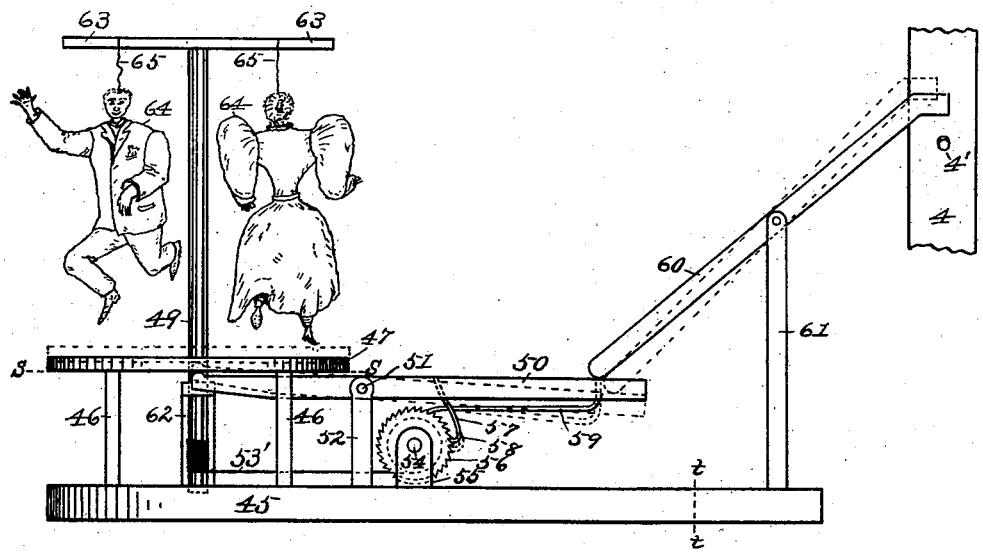
Figure 13:
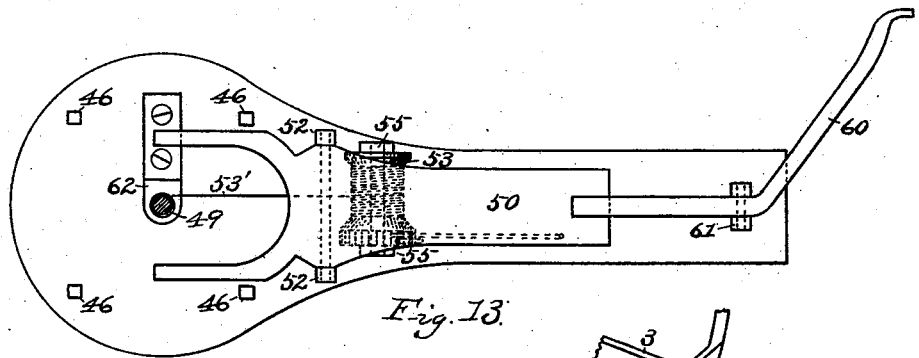
Figures 14, 15:
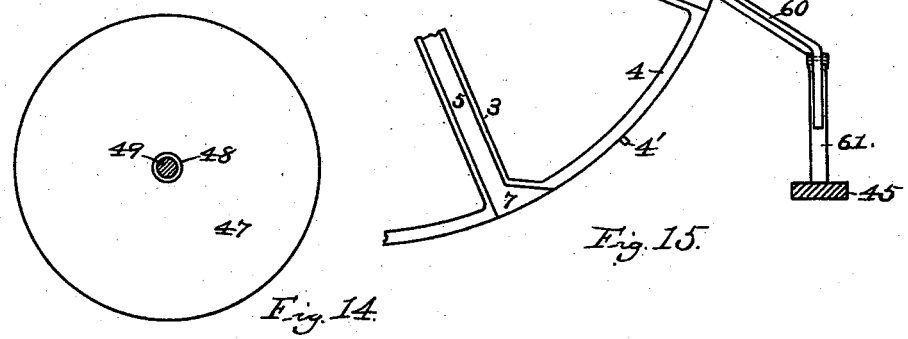

In the accompanying drawings, Figure 1 is a front elevation of a machine or apparatus embodying my invention. Fig. 2 is a central vertical section taken on line $x$ $x$ of Fig. 1. Fig. 3 is a front elevation similar to Fig. 1, showing a portion of the machine, the incline being omitted and the tubes, slides, and casing being shown in central vertical section. Fig. 4 is a front elevation of the main wheel. Fig. 5 is an edge view of the same. Fig. 6 is a cross-section on line $y$ $y$ of Fig. 4. Fig. 7 is a cross-section of one of the grooved spokes on line $z$ $z$ of Fig. 4. Fig. 8 is a cross-section of one of the pockets on line $r$ $r$ of Fig. 4. Fig. 9 is a top or plan view of one of the slides. Fig. 10 is a top or plan view of the plate on which the slide rests. Fig. 11 is a top or plan view of the other slide. Fig. 12 is a side elevation of the dancing device. Fig. 13 is a top or plan view of the same, sectioned on line $s$ $s$ of Fig. 12. Fig. 14 is a top or plan view of the dancing disk or platform. Fig. 15 is a detail view showing how the dancing device is operated, taken in section on line $t$ $t$ of Fig. 12. Fig. 16 is a top or plan view of the device used to bring the figures or images up to their normal position. Fig. 17 is a top or plan view of the drawer.

Like reference-figures represent identical parts in the different views.

The main wheel 1 is rotatably mounted in frame or casing 2. This wheel has spokes 3 radiating from the hub to the rim 4. These spokes are enlarged at their outer portions and are provided with grooves or channels 5, extending from the periphery toward the hub, the grooves being of unequal lengths. These grooves terminate at their inner ends in slight enlargements or pockets 6. At their open outer ends they have the enlargements or mouths 7. The hub has a ratchet-wheel 8 rigidly secured thereto.

The vertical tube 9 is secured in the frame or casing and contains a number of balls 10. Beneath the tube 9 is a slide 11. The inner end of this slide is equal in thickness to the diameter of a ball 10, and is provided with a hole 12 just beneath the tube 9 and about equal in diameter to the inside of said tube. The slide is provided at its outer end with a pressure-button 13. The inner end of the slide has a projection 14 extending downward and inward.

Just above slide 11 is a vertical tube 15, secured in the frame or casing. The slide is provided with a hole or opening 16 just beneath tube 15, the hole being about equal in diameter to the inside of tube 15. The tube 15 receives the counters 17, which may consist of metal disks, coins, or other forms desired. The part of the slide beneath tube 15 is equal in thickness to one of the counters 17.

Beneath slide 11 is a plate 18. This plate has the two holes 19 and 20. Beneath hole 20 is a vertical tube 21, extending down to the rim or periphery of wheel 1. Beneath hole 19 is a vertical tube 22, held by suitable supports 23. Beneath tube 22 is a slide 24. Beneath slide 24 is an inclined tube 25, held by suitable supports 26. The lower end of tube 25 is just over a compartment 27 of the drawer 28.

Plate 18 is provided with the lugs 29, between which is pivoted the pawl 30. The end of pawl 30 rests upon slide 11.

A spring 31 is secured by screws or otherwise to casing 2 and extends down below the center of wheel 1, curving toward the center of the wheel and terminating in the hook 32.

In front of the lower half of wheel 1 is a vertical plate 33. In front of the upper half of wheel 1 is a plate 34', preferably made of glass, and represented as transparent or invisible in Fig. 1. The upper part of plate 33 has a series of holes 35 on a horizontal line even with the center of wheel 1.

In front of plate 33 is an incline 34. The upper part of this incline is provided with a considerable number of pins or studs 36 projecting upward from the incline. The lower part of the incline is provided with the parallel grooves or troughs 37. The lower end of each groove 37 has a hole 38 leading down through the incline to the drawer. Just above grooves 37 is a series of figures or images 39 representing men, each having its feet resting in a groove 37. These images are provided with the projections 40 at the rear of the thighs, perforated to receive the transverse wire or rod 41. Rod 41 is pivotally mounted in the casing and is provided with a head or finger-piece 42 outside the casing. A similar rod 43 extends across in front of the waists of the images and is connected to rod 41 by means of the short pieces 43', which should be integral with the two rods.

The incline 34 has a curved glass cover 44, which is represented as transparent or invisible in Fig. 1.

The dancing device has a base-piece 45, from which project upward the posts 46, 52, 55, and 61. The circular plate or platform 47 has a central opening 48 to receive center pole 49 and rests upon posts 46. The lever 50 is pivoted at 51 between the posts 52, and its bifurcated inner end is in contact with the under side of plate or platform 47. The spool 53 is pivoted at 54 between the posts 55. Cord 53' has one end lapped around spool 53 and the other end lapped around center pole 49, as shown. Spool 53 has a ratchet-wheel 56 rigidly secured at one end. Spring-pawl 57, carried by lever 50, has a hook 58 at its lower end which engages ratchet 56. Spring-pawl 59, carried by lever 50, also engages ratchet 56. The curved lever 60 is pivoted in the upper end of post 61.

The center pole 49 is loosely set in a shallow hole in base-piece 45. A brace 62 is secured to base 45 and has its horizontal upper end perforated to receive the center pole 49 and hold it against lateral play. The upper end of center pole 49 is provided with one or more horizontal arms 63. From these arms the dancing images or figures 64 are suspended. The string or cord 65 is attached to the arm 63 and to the top of the head of the dancing image. The limbs or members of the images should be loosely pivoted together at the joints in the manner well known to those skilled in the art in order to give a life-like motion.

The operation is as follows: The operator presses button 13, thus carrying the slide 11 inward to the position shown in dotted lines in Fig. 3. The ball 10, which rests in hole 12 of slide 11, will be carried inward and will drop down through hole 20 into tube 21, where it will lodge upon the rim 4 of wheel 1. At the same time the counter 17, resting in hole 16 in slide 11, will be carried inward and will drop down through hole 19 into tube 22. Tubes 9, 15, and 22 are preferably made of glass, so that the balls and counters may be seen by the operator. The hole 19 is so placed that the counter 17 will drop into tube 22 a little before ball 10 drops into tube 21. In case there is no counter 17 in tube 15 the end of pawl 30 will drop down into hole 16 and prevent the slide 11 from being pressed inward far enough to allow the ball 10 to drop into tube 21. When the slide 11 is pressed inward, the projection 14 engages spring 31 and carries it inward to the position shown in dotted lines in Fig. 3, the hooked end 32 engaging the ratchet-wheel 8. When the pressure-button 13 is released, the spring 31 retracts, giving wheel 1 a whirl. When slide 11 returns to normal position, the column of balls in tube 9 drops down, the lowest one entering hole 12. The lowest counter 17 will also enter hole 16 in slide 11. When wheel 1 is set to revolving, the ball in tube 21 drops into the mouth 7 of the first groove 5, passing under it, and rolls down into the pocket 6. The ball is prevented from escaping outward by the glass plate 34' and the plate 33. When the pocket comes opposite an opening 35, the ball rolls through it, the pocket being somewhat flaring, so as to cause the ball to roll out readily. When the ball passes through the opening 35, it starts down the incline 34. Here it encounters the pins or studs 36, being deflected right and left. It finally reaches a groove 37 and strikes against the feet of an image 39. The image falls promptly backward to the position shown in dotted lines in Fig. 2, swinging pivotally around rod 41 and its feet flying into the air. The ball then passes down through opening 38 into the drawer 28. In case another ball should roll down the same groove 37, when the machine is again operated, it will lodge against the head of the fallen image and remain there. By turning finger-piece 42 the rod 43 will engage the feet of the fallen image or images 39 and carry them around to a normal position, bringing the image or images to an upright position again. If a ball has lodged against the head of an image when in its fallen position, it will then pass down into the drawer through opening 38. The images 39 are preferably solid and not jointed.

Some of the images, as 39', may be painted to represent negroes, while the center one, 39², may represent an Indian. Different values may be given to these images. Thus a white man may represent 1, a negro 2, and the Indian 5. The object of the game is to see what is the highest number the player or players can get by counting the value of the image or images knocked down in one or more trials.

The drawer 28 is provided with compartments 66, 67, and 68. The compartments 66 receive the balls which knock down the white men. The compartments 67 receive the balls which knock down the negroes. The compartment 68 receives the balls which knock down the Indian. Thus a register may be kept of all balls knocking down the images of different values or denominations. The images, however, may all be similar and represent the same value, if desired, the object then being to see the balls knock down the images as a matter of amusement.

Some of the pockets 6 are arranged to register with holes 35 to the left of the center of wheel 1, while the other pockets register with holes 35 to the right of the center of wheel 1. In the latter it is necessary to employ some means to prevent the balls from running down the grooves 5 when below the center of wheel. Pawls or stops 6' are used, and are preferably made of rubber strips set with glue or otherwise in slits in the side of grooves 5. These stops bend around to the position shown in dotted lines in Fig. 3, when the ball enters, and then spring back and bind against the opposite side of groove 5 when the ball starts to reënter the groove 5. By this means the ball is prevented from escaping from the pocket 6 until it escapes through a hole 35 to the right of center of wheel 1.

The rim 4 of wheel 1 is provided with short pins or studs 4' set at intervals. The end of lever 60 is arranged to be engaged by these studs and carried upward to the position shown in dotted lines in Fig. 12 before slipping off from the stud. The inner end of the lever 60 being depressed the outer end of lever 50 is depressed thereby, and the inner end of this lever being suddenly elevated the plate or disk 47 is suddenly elevated in turn. This motion tosses the figures or images 64 into the air and gives them a life-like motion. At the same time the hooked end of springpawl 57 comes down to the position shown in dotted lines in Fig. 12 and engages a new ratchet-tooth. Pawl 59 prevents the ratchetwheel from turning in a reverse direction. When lever 50 again assumes its normal position by gravity, the spool 53 will be turned one notch, the cord 53' will be wound to that extent upon the spool, and the center pole 49 will be turned a corresponding distance about its axis. This action will be repeated every time a stud 4' comes in contact with the end of lever 60. The images 64 will consequently circle around the center pole with a lively or jumping motion very closely resembling dancing by living persons. The dancing figures 64 will thus furnish a great amount of amusement and entertainment.

When cord 53' is all wound off of center pole 49, the pawls 57 and 59 are disengaged from ratchet 56, and the center pole 49 is turned in reverse direction until the cord is wound thereon to a sufficient amount.

The counters 17 in tube 22 should be equal in number to the balls 10 in drawer 28. When slide 24 is drawn out, the counters will drop down through tube 25 into compartment 27 of drawer 28.

Slide 24 may be drawn out after each game, if desired, and then the counters in the tube 22 at the end of the following game will show the number of plays which have been made during that game.

The tubes 15, 22, and 25 may be dispensed with in some cases, if desired, the tube 9 and balls 10 being used without the counters 17.

Having thus fully described my invention, what I claim as new, and desire to secure by Letters Patent, is—

1. In a game apparatus, the combination, with a magazine for the balls, of a grooved wheel, a grooved incline in front of said wheel, means for delivering the balls from the magazine to the grooved wheel, means for delivering the balls from the grooved wheel to the grooved incline, and means to indicate the value scored by a ball in passing down any particular part of the incline, substantially as set forth.

2. In a game apparatus, the combination, with a magazine for the balls, of a wheel adapted to receive the balls, an incline in front of said wheel, means for delivering the balls from the magazine to the wheel, means for delivering the balls from the wheel to the incline, and means to indicate the value scored by a ball in passing down any particular part of the incline, substantially as set forth.

3. In a game apparatus, the combination, with a wheel having radial grooves of unequal lengths to receive balls, of an incline in front of said wheel, and means for delivering the balls from the wheel to the incline, substantially as set forth.

4. In a game apparatus, the combination, with a wheel having grooved spokes to receive balls, of means for delivering the balls to the grooved spokes, substantially as set forth.

5. In a game apparatus, the combination, with a wheel having radial grooves of unequal lengths to receive balls, of means for delivering the balls to the radial grooves, substantially as set forth.

6. In a game apparatus, the wheel having grooves to receive the balls, and means within the grooves to prevent the balls from retracing their entering paths or courses as the wheel revolves, substantially as set forth.

7. In a game apparatus, the wheel having grooves to receive the balls, and pawls or stops within the grooves to prevent the balls from retracing their entering paths or courses as the wheel revolves, substantially as set forth.

8. In a game apparatus, the combination, with a wheel having channels to receive the balls, of a slide for delivering the balls to the channels and means to rotate the wheel by the operation of said slide, substantially as set forth.

9. In a game apparatus, the combination, with a wheel having channels to receive the balls, and a ratchet-wheel carried by said wheel, of a slide for delivering the balls to the channels, a spring having a hook or detent adapted to engage said ratchet-wheel, said spring being engaged by said slide and thereby caused to rotate said wheel, substantially as set forth.

10. In a game apparatus, the combination, with a wheel having channels to receive the balls, and a ratchet-wheel carried by said wheel, of a slide for delivering the balls to the channels, a downward projection carried by said slide, a spring having a hook or detent, said spring being engaged by said slide when the latter is operated and said hook or detent being thereby caused to engage said ratchet-wheel and rotate said wheel, substantially as set forth.

11. In a game apparatus, a wheel having channels to receive the balls, and means for rotating said wheel, substantially as set forth.

12. In a game apparatus, the combination, with a wheel having channels to receive the balls, of a plate having holes registering with the inner ends of said channels, and through which the balls may pass, and an incline in front of said plate down which the balls may roll, substantially as set forth.

13. In a game apparatus, the combination, with a wheel having channels to receive the balls, of a plate having holes registering with the inner ends of said channels, respectively, and through which the balls may pass, substantially as set forth.

14. In a game apparatus, the combination, with a wheel having channels to receive the balls, of a plate having holes registering with the inner ends of said channels, and through which the balls may pass, and an incline in front of said plate down which the balls may roll, and devices to represent the value scored by the ball in passing down any particular part of the incline, substantially as set forth.

15. In a game apparatus, the combination, with an incline having grooves therein, of devices arranged in said grooves and adapted to be operated by balls passing down the grooves, substantially as set forth.

16. In a game apparatus, the combination, with an incline having grooves therein, of images pivotally mounted above said grooves, and adapted to be tilted over or knocked down by balls rolling down said grooves, the heads of the images resting in the grooves when so knocked down, substantially as set set forth.

17. In a game apparatus, the combination, with an incline, of images pivotally mounted above said incline and adapted to be knocked down by balls rolling down said incline, and means for returning said images to their normal position, substantially as set forth.

18. In a game apparatus, the combination, with an incline, of images above said incline and adapted to be knocked down by balls rolling down said incline, a rod upon which said images are pivotally mounted, and a second rod carried by the first-named rod and adapted to engage and return said images to their normal position, substantially as set forth.

19. In a game apparatus, the combination, with an incline, of images pivotally mounted above said incline and adapted to be knocked down by balls rolling down said incline, and a transverse rod adapted to engage and return said images to their normal position, substantially as set forth.

20. In a game apparatus, the combination, with a wheel having radial channels, of a grooved incline in front of said wheel, devices to be operated by balls rolling down said grooves, and openings at the lower ends of said grooves communicating with compartments in the drawer below, whereby a registration may be kept of the values scored by said balls, substantially as set forth.

21. In a game apparatus, the combination, with a center pole, of a plate or platform, an image above said platform, a cord 65 suspending said image from said center pole, and means for elevating and lowering said platform, whereby the image is set in motion, substantially as set forth.

22. In a game apparatus, the combination, with a center pole, and a cross-arm carried by said pole, of a plate or platform, an image above said platform, a cord 65 suspending said image from said cross-arm, and means for elevating and lowering said platform, whereby the image is set in motion, substantially as set forth.

23. In a game apparatus, the combination, with a center pole, of a plate or platform, an image above said platform, a cord 65 suspending said image from said center pole, and means for elevating and lowering said platform, said means deriving motion from the center wheel 1, substantially as set forth.

24. In a game apparatus, the combination, with a center pole, of a plate or platform, an image above said platform, a cord suspending said image from said center pole, means for elevating and lowering said platform, and means for revolving said center pole, whereby the image is given a dancing motion, substantially as set forth.

25. In a game apparatus, the combination, with a center pole, of a plate or platform, a lever having one end beneath said platform, a spool having a ratchet-wheel, a spring-pawl carried by said lever and engaging said ratchet, a cord having one end wound around said spool and the other end wound around said center pole, whereby the platform is elevated and lowered and the center pole is rotated by the operation of said lever, substantially as set forth.

26. In a game apparatus, the combination, with a center pole, of a plate or platform, a lever having one end beneath said platform, a spool having a ratchet-wheel, a spring-pawl carried by said lever and engaging said ratchet, a cord having one end wound around said spool and the other end wound around said center pole, whereby the platform is elevated and lowered and the center pole is rotated by the operation of said lever, a second lever adapted to operate said first-named lever, said second lever being engaged and operated by studs projected from the rim of main wheel 1, substantially as set forth.

In testimony whereof I affix my signature in presence of two witnesses.

LOCKERT N. SHOEMAKER.

Witnesses:
N. P. CLYBURN,
U. B. NEWMAN.